US010863452B2

(12) United States Patent
Kerger (10) Patent No.: US 10,863,452 B2
(45) Date of Patent: Dec. 8, 2020

(54) METHOD AND RADIO FOR SETTING THE TRANSMISSION POWER OF A RADIO TRANSMISSION

(71) Applicant: Rohde & Schwarz GmbH & Co. KG, Munich (DE)

(72) Inventor: Stefan Kerger, Aufkirchen (DE)

(73) Assignee: ROHDE & SCHWARZ GMBH & CO. KG, Munich (DE)

(*) Notice: Subject to any disclaimer, the term of this patent is extended or adjusted under 35 U.S.C. 154(b) by 0 days.

(21) Appl. No.: 16/655,669

(22) Filed: Oct. 17, 2019

(65) Prior Publication Data
US 2020/0196248 A1 Jun. 18, 2020

(30) Foreign Application Priority Data
Dec. 12, 2018 (EP) .................................... 18212056

(51) Int. Cl.
*H04W 52/28* (2009.01)
*H04W 52/24* (2009.01)
(Continued)

(52) U.S. Cl.
CPC .......... *H04W 52/283* (2013.01); *G01S 19/05* (2013.01); *H04W 52/243* (2013.01);
(Continued)

(58) Field of Classification Search
CPC . H04W 52/283; H04W 52/243; H04W 52/48; H04W 52/50; H04W 52/52; H04W 64/006; G01S 19/05
See application file for complete search history.

(56) References Cited

U.S. PATENT DOCUMENTS 6,781,974 B1* 8/2004 Tsumura ............. H04W 72/085
370/335
7,236,128 B2* 6/2007 Sugar ..................... G01S 5/0226
342/174
(Continued)

FOREIGN PATENT DOCUMENTS

CA 2306018 10/2000
CA 2814829 9/2003
(Continued)

OTHER PUBLICATIONS

Extended European search report for European Patent Application No. 18212056.8, dated May 22, 2019, 8 pages.

*Primary Examiner* — Dominic E Rego
(74) *Attorney, Agent, or Firm* — Westman, Champlin & Koehler, P.A.

(57) ABSTRACT

The present invention relates to a method for setting the transmission power of a radio transmission of a transmitting radio, the method comprising: determining the position of a first radio and of a second radio, wherein for determining the position geo location information are used; calculating the distance between the first radio and the second radio based on the determined positions of the first and second radio; calculating the attenuation of a radio transmission from the transmitting first radio to the receiving second radio based on the calculated distance; and setting the transmission power of the transmitting first radio based on the calculated attenuation of the radio transmission. The invention further relates to a radio for transmitting radio signals.

14 Claims, 4 Drawing Sheets

(51) Int. Cl.
*H04W 52/50* (2009.01)
*H04W 52/52* (2009.01)
*H04W 64/00* (2009.01)
*G01S 19/05* (2010.01)
*H04W 52/48* (2009.01)

(52) U.S. Cl.
CPC .......... *H04W 52/48* (2013.01); *H04W 52/50* (2013.01); *H04W 52/52* (2013.01); *H04W 64/006* (2013.01)

(56) References Cited

U.S. PATENT DOCUMENTS

| | | | |
|---|---|---|---|
| 7,489,663 | B2 | 2/2009 | Ogawa et al. |
| 7,495,614 | B2 | 2/2009 | Small |
| 7,751,829 | B2 | 7/2010 | Masuoka et al. |
| 7,948,914 | B2* | 5/2011 | Azimi .......... H04W 48/04 370/252 |
| 8,436,772 | B2 | 5/2013 | Meyer et al. |
| 9,055,451 | B2 | 6/2015 | Kim et al. |
| 9,313,762 | B2 | 4/2016 | Ben Hamida et al. |
| 9,319,840 | B2 | 4/2016 | Porzio Giusto |
| 9,341,701 | B2 | 5/2016 | Sellier et al. |
| 9,781,584 | B2* | 10/2017 | Nagata .......... H04W 52/28 |
| 9,820,100 | B1 | 11/2017 | Jarvis et al. |
| 10,228,437 | B2 | 3/2019 | Roquel |
| 10,228,453 | B2 | 3/2019 | Kuang |
| 10,595,174 | B2* | 3/2020 | Kerselaers .......... B60W 30/09 |
| 2002/0059535 | A1 | 5/2002 | Bekritsky et al. |
| 2002/0071408 | A1 | 6/2002 | Ogawa et al. |
| 2004/0246986 | A1 | 12/2004 | Belcea |
| 2004/0266457 | A1 | 12/2004 | Dupray |
| 2005/0014518 | A1 | 1/2005 | Spain, Jr. et al. |
| 2005/0020279 | A1 | 1/2005 | Markhovsky et al. |
| 2005/0035906 | A1* | 2/2005 | Krause .......... G01S 5/08 342/398 |
| 2005/0136845 | A1 | 6/2005 | Masuoka et al. |
| 2005/0143100 | A1 | 6/2005 | Shi et al. |
| 2005/0195109 | A1* | 9/2005 | Davi .......... G01S 11/06 342/463 |
| 2005/0261004 | A1 | 11/2005 | Dietrich et al. |
| 2006/0149475 | A1* | 7/2006 | Kellum .......... G01S 11/06 701/300 |
| 2006/0232467 | A1 | 10/2006 | Small |
| 2007/0253394 | A1* | 11/2007 | Horiguchi .......... H04W 16/14 370/338 |
| 2008/0122695 | A1 | 5/2008 | Wang et al. |
| 2008/0143603 | A1 | 6/2008 | Bornholdt |
| 2008/0161005 | A1* | 7/2008 | Sato .......... H04W 16/225 455/446 |
| 2008/0316103 | A1* | 12/2008 | Rofougaran .......... G01S 13/426 342/386 |
| 2009/0033518 | A1* | 2/2009 | Muramatsu .......... G01S 11/06 340/988 |
| 2009/0047988 | A1* | 2/2009 | Kanda .......... H04W 52/50 455/522 |
| 2009/0088083 | A1* | 4/2009 | Fujii .......... H04W 52/367 455/69 |
| 2009/0254789 | A1* | 10/2009 | Chen .......... H04L 1/007 714/746 |
| 2010/0063652 | A1 | 3/2010 | Anderson |
| 2010/0184457 | A1* | 7/2010 | Hupp .......... G01S 5/0289 455/517 |
| 2010/0284323 | A1* | 11/2010 | Tang .......... H04B 3/548 370/321 |
| 2010/0286953 | A1* | 11/2010 | Kim .......... H04B 17/26 702/179 |
| 2011/0117924 | A1* | 5/2011 | Brunner .......... H04W 4/027 455/456.1 |
| 2011/0149885 | A1* | 6/2011 | Bachu .......... H04W 74/008 370/329 |
| 2011/0171973 | A1 | 7/2011 | Beck et al. |
| 2011/0316748 | A1 | 12/2011 | Meyer et al. |
| 2012/0052891 | A1* | 3/2012 | Irnich .......... H04W 52/281 455/501 |
| 2012/0119880 | A1* | 5/2012 | Ponnuswamy .......... G01S 5/14 340/8.1 |
| 2012/0246074 | A1 | 9/2012 | Annamalai et al. |
| 2012/0295636 | A1* | 11/2012 | Drucker .......... H04W 4/33 455/456.1 |
| 2013/0003572 | A1 | 1/2013 | Kim et al. |
| 2013/0143588 | A1 | 6/2013 | Flanagan et al. |
| 2013/0225200 | A1 | 8/2013 | Ben Hamida et al. |
| 2013/0235864 | A1 | 9/2013 | Do et al. |
| 2013/0250851 | A1 | 9/2013 | Lakhzouri et al. |
| 2013/0307723 | A1 | 11/2013 | Garnin et al. |
| 2013/0310074 | A1 | 11/2013 | Porzio Giusto |
| 2013/0331131 | A1 | 12/2013 | Fix et al. |
| 2014/0129127 | A1 | 5/2014 | Kane et al. |
| 2014/0153773 | A1 | 6/2014 | Gupta et al. |
| 2014/0169569 | A1* | 6/2014 | Toivanen .......... H04R 5/04 381/17 |
| 2014/0171098 | A1 | 6/2014 | Marti et al. |
| 2014/0171114 | A1 | 6/2014 | Marti et al. |
| 2014/0171118 | A1 | 6/2014 | Marti et al. |
| 2014/0179340 | A1 | 6/2014 | Do et al. |
| 2014/0213299 | A1 | 7/2014 | Marti et al. |
| 2014/0256348 | A1* | 9/2014 | Wirola .......... H04W 64/00 455/456.1 |
| 2014/0274111 | A1 | 9/2014 | Edge et al. |
| 2014/0378161 | A1 | 12/2014 | Sellier et al. |
| 2015/0071081 | A1* | 3/2015 | Gupta .......... H04W 52/40 370/241 |
| 2015/0094952 | A1 | 4/2015 | Moeglein et al. |
| 2015/0105086 | A1 | 4/2015 | Thiel et al. |
| 2015/0145721 | A1 | 5/2015 | Li et al. |
| 2015/0201306 | A1 | 7/2015 | Kazemi et al. |
| 2015/0285895 | A1 | 10/2015 | Lin et al. |
| 2015/0296473 | A1* | 10/2015 | Chan .......... G01S 5/14 455/456.1 |
| 2015/0341753 | A1 | 11/2015 | Chen et al. |
| 2016/0028533 | A1* | 1/2016 | Kazmi .......... H04W 72/0413 370/296 |
| 2016/0077190 | A1 | 3/2016 | Julian |
| 2016/0077191 | A1 | 3/2016 | Julian et al. |
| 2016/0142982 | A1* | 5/2016 | Kim .......... H04W 52/283 370/311 |
| 2016/0187138 | A1 | 6/2016 | Chakraborty et al. |
| 2016/0323753 | A1* | 11/2016 | Zhang .......... H04B 17/318 |
| 2016/0337809 | A1* | 11/2016 | Narasimha .......... H04W 4/023 |
| 2016/0341578 | A1 | 11/2016 | Park et al. |
| 2017/0272998 | A1* | 9/2017 | Choi .......... H04W 36/0072 |
| 2018/0011164 | A1* | 1/2018 | Kitsunezuka .......... H04B 17/318 |
| 2018/0017660 | A1 | 1/2018 | Roquel |
| 2018/0046187 | A1* | 2/2018 | Martirosyan .......... G05D 1/0094 |
| 2018/0213487 | A1 | 7/2018 | Chae et al. |
| 2018/0262288 | A1* | 9/2018 | Gao .......... H04J 11/004 |
| 2018/0348351 | A1 | 12/2018 | Kuang |
| 2020/0033438 | A1 | 1/2020 | Isson |
| 2020/0153688 | A1* | 5/2020 | Wirola .......... H04W 16/20 |

FOREIGN PATENT DOCUMENTS

| | | |
|---|---|---|
| CA | 2855087 A1 | 1/2006 |
| CA | 2894309 A1 | 10/2010 |
| CA | 2847751 A1 | 3/2013 |
| CA | 2969807 A1 | 6/2016 |
| CN | 107249167 | 10/1917 |
| CN | 108521631 | 9/1918 |
| CN | 101534481 A | 9/2009 |
| CN | 101772156 A | 7/2010 |
| CN | 102075936 A | 5/2011 |
| CN | 103809154 A | 5/2014 |
| CN | 105430740 A | 3/2016 |
| CN | 105699938 A | 6/2016 |
| CN | 105738863 A | 7/2016 |
| DE | 102004043534 A1 | 3/2006 |
| DE | 102015122145 A1 | 6/2017 |
| EP | 0662758 | 7/1995 |
| EP | 1 942 585 A1 | 7/2008 |
| ES | 2506290 T3 | 10/2014 |

(56) References Cited

FOREIGN PATENT DOCUMENTS

| | | |
|---|---|---|
| FR | 2986680 A1 | 8/2013 |
| GB | 2479627 A | 10/2011 |
| IT | TO20110168 A1 | 8/2012 |
| JP | 2005099018 A | 4/2005 |
| KR | 100994840 B1 | 11/2010 |
| WO | 9810538 A1 | 3/1998 |
| WO | 9954752 | 10/1999 |
| WO | 0045191 A2 | 8/2000 |
| WO | 0158194 | 8/2001 |
| WO | 0172060 A1 | 9/2001 |
| WO | 0249270 | 6/2002 |
| WO | 2004023155 A1 | 3/2004 |
| WO | 2007044135 A1 | 4/2007 |
| WO | 2008048059 A1 | 4/2008 |
| WO | 2008073347 A1 | 6/2008 |
| WO | 2008143483 A1 | 11/2008 |
| WO | 2010046058 A1 | 4/2010 |
| WO | 2010052496 A1 | 5/2010 |
| WO | 2010059934 A2 | 5/2010 |
| WO | 2010059935 A1 | 5/2010 |
| WO | 2010134933 A1 | 11/2010 |
| WO | 2011016804 A1 | 2/2011 |
| WO | 2011035028 A1 | 3/2011 |
| WO | 2011047310 A1 | 4/2011 |
| WO | 2011077166 A1 | 6/2011 |
| WO | 2011129617 A2 | 10/2011 |
| WO | 2011135406 A1 | 11/2011 |
| WO | 2011137396 A1 | 11/2011 |
| WO | 2012034830 A1 | 3/2012 |
| WO | 2012166370 | 12/2012 |
| WO | 2013018085 A1 | 2/2013 |
| WO | 2013151798 | 10/2013 |
| WO | 2013173163 A1 | 11/2013 |
| WO | 2014144058 A2 | 9/2014 |
| WO | 2015027118 | 2/2015 |
| WO | 2015117477 A1 | 8/2015 |
| WO | 2016028208 A1 | 2/2016 |
| WO | 2016/050258 A1 | 4/2016 |
| WO | 2016207591 A1 | 12/2016 |
| WO | 2017079975 A1 | 5/2017 |
| WO | 2017211153 A1 | 12/2017 |
| WO | 2018167231 A1 | 9/2018 |

\* cited by examiner

METHOD AND RADIO FOR SETTING THE TRANSMISSION POWER OF A RADIO TRANSMISSION

CROSS-REFERENCE TO RELATED APPLICATIONS

This application claims priority to European Patent Application No. 18212056.8, filed on Dec. 12, 2018, the content of which is hereby incorporated by reference in its entirety.

FIELD OF THE INVENTION

The present invention relates to a method for setting the transmission power of a radio transmission of a transmitting radio. The invention further relates to a radio for transmitting radio signals.

TECHNICAL BACKGROUND

The present invention and its underlying problem are hereinafter described by the example of mobile radio stations (or radio devices, radio units or shortly radios) having a local power supply such as a battery or accumulator, however, it should be understood that the present invention is not restricted to this application.

It is well known that the attenuation of a radio signal emitted by a transmitting radio decreases in square with increasing distance. This means that the necessary transmission power increases with increasing distance between two radios in the square of the distance between the two radios. However, today's battery-powered radios typically have a constant transmission range of 100-120 km, for example, regardless the distance of the two radios communicating with each other is. If two radios communicating with each other are positioned very close to each other, the radios still transmit with the constant transmission power, even if this would not be necessary by far. This is not only disadvantageous from an energy point of view, as the limited energy resources of the local energy source are exhausted more quickly in this case. In addition, the transmitting radios are easier to identify or detect for any unwanted subscribers, which is in particular problematic for security applications. In this respect, there is a need to adapt the transmission power to the given situation of the environment.

However, for users of mobile radios it is always difficult to provide on the one hand the necessary transmission power and on the other hand to strive for optimum power consumption with the existing power supply. E.g., if the transmission power is too low, then there is the chance that radio units which are arranged in greater distance will not receive a transmitted radio signal. On the other hand, if the transmission power is increased in order to guarantee the transmission to distanced radio units, the battery life time decreases significantly.

International patent application WO 2016 050258 A1 describes a positioning method of a mobile user equipment within a wireless communication network. The wireless communication network comprises at least one radio communication station which is transmitting radio signals over a geographic area to several user equipments. The position of an user equipment within the wireless communication network is obtained by calculating an attenuation at the user equipment through an iteration on the basis of the expected signal and the measured signal received.

In particular, the calculation is performed based on expected radio signal strengths produced by the at least one radio communication station, on radio signal strength measurements of the radio signals provided to the user equipment whose position is to be identified and on an estimated elementary area element corresponding to the position of the user equipment whose position is to be identified on the basis of the expected radio signal strengths, the initial attenuation and the radio signal strength measurements.

SUMMARY OF THE INVENTION

Against this background, there is a need to provide a simple and reliable possibility for setting the transmission power of a radio transmission.

The present invention provides a method and a radio having the features of the independent claims.

According thereto, the following is provided:

A method for setting the transmission power of a radio transmission of a transmitting radio, the method comprising: determining the position of a first radio and of a second radio, wherein for determining the position a geo location information are used; calculating the distance between the first radio and the second radio based on the determined positions of the first and second radio; calculating the attenuation of a radio transmission from the transmitting first radio to the receiving second radio based on the calculated distance; and setting the transmission power of the transmitting first radio based on the calculated attenuation of the radio transmission.

A radio for transmitting and receiving radio signals, the radio comprising: a localisation unit which is adapted to determine the position of the radio and which is further adapted to receive position information of a further radio, wherein geo location information are used for the determination of the positions of the radios; a radio transmitter which is configured to transmit a radio signal to the further radio; a calculation unit which is adapted to calculate the distance to the further radio based on the determined position and which is further adapted to calculate the attenuation of a radio signal which is transmitted from the radio transmitter to the receiving further radio based on the calculated distance; and a smart power setting unit which is configured to set the transmission power of radio transmitter based on the calculated attenuation of the radio transmission.

The present invention is based on the idea that by employing geo location for at least two radios, it is possible to calculate the attenuation between these radios based on their distance to each other. The present invention is further based on the concept of determining the altitude information of the radios, e.g. also based on the information of the geo location. Further, based on the calculated attenuation between the radios, the known signal-to-noise ratio (SNR) demand and the altitude information, the optimum transmission power for a radio transmission from one of the radios to another one can be set.

The benefits of this invention are as simple as they are effective:

On the one hand, the method and radio according to the present invention enables a longer battery life, which means that the radio can be operated for longer before its battery has to be replaced or its accumulator (rechargeable battery) has to be recharged.

In addition, it provides an improved radio coverage, which is particularly adapted to the position of the various receiving radios, thus reducing the risk of communication interruptions.

In addition, after the radius of the transmitted signal has been aligned and optimized to the position of the receiver of the radio signals, it is now more difficult for measurement devices to detect the position of the transmitter of a radio signal by locating and tracking the transmitted radio signal. Both the transmitter and the receiver of the radio signals thus show a lower radio visibility, which is particularly advantageous for safety-critical applications, such as police or military applications.

Advantageous configurations and developments emerge from the further dependent claims and from the description with reference to the figures of the drawings.

In a preferred embodiment, the step of setting the transmission power includes the calculation of a transmission power value. This calculated transmission power value defines the transmission power which is necessary for providing a reliable transmission from the transmitting first radio to the receiving second radio. A reliable transmission means that this ensures that the transmission takes place with a high degree of reliability and, above all, that it is not interrupted during the transmission. Preferably, a value of the transmission power required for the transmission is calculated and this calculated value is multiplied by a safety factor greater than one.

In a preferred embodiment, a SRTM dataset is employed for providing the geo location information, wherein the SRTM dataset comprises information of the elevation profile of the Earth's surface surrounding the first radio and second radio and preferably also the area between the first radio and second radio. Shuttle Radar Topography Mission (SRTM) data are remote sensing data of the Earth's surface recorded from space. They serve to create a uniform, high-resolution digital terrain model of the Earth's surface. With SRTM, even impassable regions of the earth were recorded and measured. These SRTM data are freely available with a resolution of presently 1 arc second (approx. 30 m). Using SRTM data allows more complex propagation models and further to obtain a more accurate calculation of the expected attenuation and distance.

In a preferred embodiment, the SRTM dataset is stored in a memory within the transmitting first radio so that there is no need for the corresponding first radio to acquire the SRTM data online for the calculation of an optimum transmission power. This is especially advantageous in those regions where no or only a poor online access is available.

In a preferred embodiment, GNSS is employed for providing the geo location information. A Global Navigation Satellite System (GNSS) is a system for positioning and navigating on Earth and in the air by receiving signals from navigation satellites and pseudolites. GPS (Global Positioning System), GLONASS (Global Navigation Satellite System), Galileo and Beidou are examples of GNSS. The satellites of GNSS communicate their exact position and time via radio codes. To determine their position, a GNSS receiver must receive signals from at least four GNSS satellites simultaneously. The GNSS receiver measures the pseudo signal propagation times (from the satellites to the receiving antenna including clock errors of the receiver) and determines the current position (including altitude) and the clock errors. According to the present invention, a radio has preferably an internal GNSS receiver for receiving location information of the radio.

In a preferred embodiment, the calculating of the attenuation is based on the Fresnel method. The Fresnel formulas quantitatively describe the reflection and transmission of a plane electromagnetic wave at a plane boundary surface. The initially calculated reflection and transmission factor is the ratio of the reflected or transmitted amplitude to that of the incident wave. Squaring gives the degree of reflection or transmission, which represent intensity ratios as energy quantities. With the Fresnel method it is possible to calculate the attenuation of a radio transmission in a specific topography precisely, i.e. with a high degree of security.

In another preferred embodiment, the calculating of the attenuation is based on the ray tracing method. Ray tracing (or raytracing) is an algorithm based on the emission of rays to calculate masking, i.e. to determine the visibility of three-dimensional objects from a certain point in space. Ray tracing also refers to the calculation of the path of rays after their impact on surfaces. Ray tracing is preferably used in 3D computer graphics which offers a possibility to display a 3D scene. In high frequency applications, ray tracing may be advantageously employed for the simulation of the path of rays through a scene, such as landscape topographies. In this application, ray tracing is very effective for precisely calculating the exact attenuation of a radio transmission in a specific topography.

In a particular preferred embodiment, the ray tracing method and the Fresnel method are combined for obtaining an exact attenuation of a radio transmission.

In a preferred embodiment, the step of setting the transmission power includes a dynamic adjustment of the transmission power. Dynamic adjustment means that the transmission power is constantly or regularly recalculated based on the existing parameters and scenarios. This is in particular preferable in case at least one of the first and second radios is moving. E.g. in case the distance between the first and second radio is reduced, then the transmission power may also be suitably reduced. This increases the battery lifetime and reduces the visibility of the transmitter within the first radio. On the other hand, if the distance is increased, the transmission power is also increased suitably which guarantees that the transmission does not collapse. In one particular preferred embodiment, the transmission power is dynamically adjusted as soon as at least power transmission related parameter, such as the distance, is changing.

In a preferred embodiment, the step of setting the transmission power includes the calculation of a link budget between the transmitting first radio and the receiving second radio. In particular, the necessary signal-to-noise ratio (SNR) between the transmitting radio and the receiving radio e.g. based on a 50 W transmission power and a 100 dB attenuation can be determined.

In a preferred embodiment, at least two receiving second radios are provided which are arranged in different distances to the transmitting first radio. For setting the transmission power of the transmitter of the first radio, in each case the distance of the receiving second radio which is furthest away from the first radio is used. This embodiment allows the transmission power to be set so that all second radios always properly receive the transmitted radio signal.

According to an alternative embodiment, at least two receiving second radios are provided which are arranged in different distances to the transmitting first radio. For setting the transmitting power of the first radio, the transmitting powers necessary for each of the second radios are determined separately. This embodiment is preferably for peer to peer applications from the first radio to one specific second radio. This embodiment allows for short distances of a second radio a reduced visibility for other second radios having a greater distance to the first radio.

In one embodiment of the radio, the localisation unit comprises a GNSS unit, such as a GPS or Galileo transceiver, for providing the geo location information.

In a further preferred embodiment, the radio comprises an internet interface. This internet interface is configured to allow the radio to be connected to the Internet. In this case, it is possible to receive geo location information and/or SRTM data directly via the Internet from suitable publically available or secured databases. The internet interface may be a wireless interface or a wired interface.

In a preferred embodiment, the first radio further comprises a memory. This memory may be used for storing suitable information, such as geo location information, position information, SRTM data, settings, etc. This way, it is not necessary to obtain these information e.g. via the internet as they are already available. This makes the calculation of the transmission power easier and more reliable in particular for those situations where there is no mobile reception.

Where appropriate, the above-mentioned configurations and developments can be combined in any manner. Further possible configurations, developments and implementations of the invention also include combinations, which are not explicitly mentioned, of features of the invention which have been described previously or are described in the following with reference to the embodiments. In particular, in this case, a person skilled in the art will also add individual aspects as improvements or supplements to the basic form of the present invention.

CONTENT OF THE DRAWINGS

The present invention is described in greater detail in the following on the basis of the embodiments shown in the schematic figures of the drawings, in which.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DESCRIPTION OF EMBODIMENTS

Figure 1:
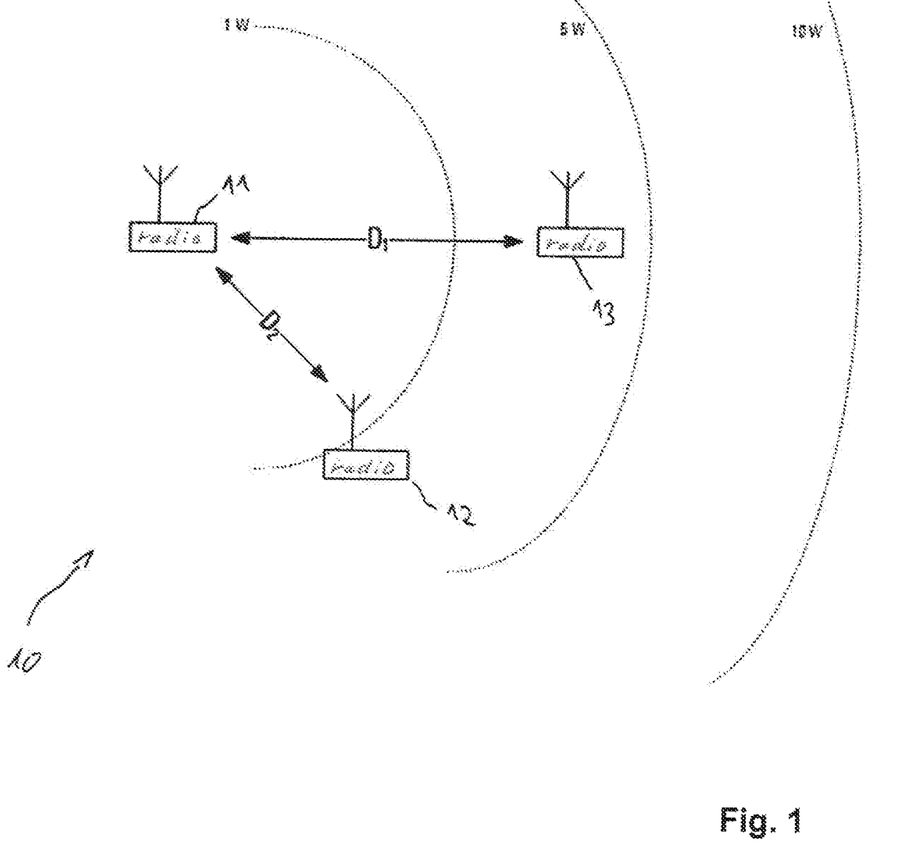
FIG. 1 is a schematic overview of a radio system.

FIG. 1 shows a schematic overview of a radio system in which the inventive method and radio can be used.

In FIG. 1, the radio system is denoted by reference sign 10. The radio system 10 comprises three radios 11, 12, 13. In this example, a radio signal of the first radio 11 is to be transmitted to the second radio 12 and the third radio 13. The distance D2 between the first radio 11 and the second radio 12 is less than the distance D1 between the first radio 11 and the third radio 13.

The distances D1, D2 can be determined according to the invention using appropriate techniques, as further explained in FIGS. 2 and 3 below. The distances D1, D2 thus determined can be used to calculate the attenuation required for radio signal transmission from the first radio 11 to the further radios 12, 13 and the SNR can then be used to calculate the transmission power required for radio signal transmission.

Figure 2:
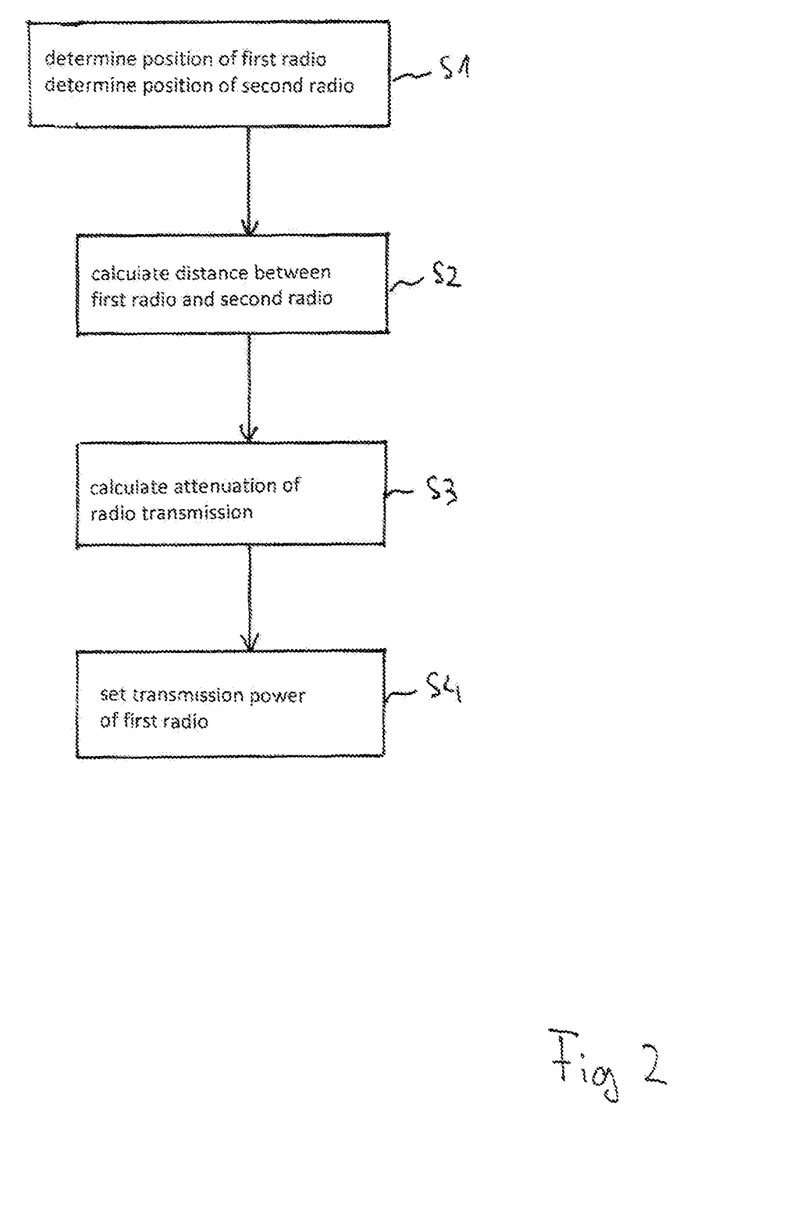
FIG. 2 shows a flow chart of a first embodiment of a method according to the invention.

FIG. 2 shows a flow chart of a first embodiment of a method according to the invention for setting the transmission power of a radio transmission of a transmitting radio, such as shown in FIG. 1.

In a first step S1, the position of a first radio 11 and the position of a second radio 12 are determined. For this step S1, geo location information, such as SRTM data and/or GNSS data, are used. The geo location information comprises amongst others position information of the first and second radios 11, 12 and information of the elevation profile in the area around the first and second radios 11, 12 and preferably also in the area between the first and second radios 11, 12.

In a second step S2, the distance D2 between the first radio 11 and the second radio 12 is calculated. The calculation is performed based on the determined positions of the first and second radios 11, 12. For the calculation of the distance D2 as well horizontal positions gathered from GNSS data but also elevation or altitude information gathered from the SRTM dataset are used.

In a subsequent step S3, the attenuation of a radio transmission from the transmitting first radio 11 to the receiving second radio 12 based on the calculated distance D2 is calculated. For this calculation step S3 of the attenuation, a Fresnel based algorithm and/or a ray tracing method may be employed.

In a final step S4, the transmission power of the transmitting first radio 11 is set. The setting of the transmission power is done based on the calculated attenuation of the radio transmission. This step includes the calculation of a transmission power value which in view of the SNR demand is necessary for providing a safe transmission from the transmitting first radio 11 to the receiving second radio 12.

Figure 3:
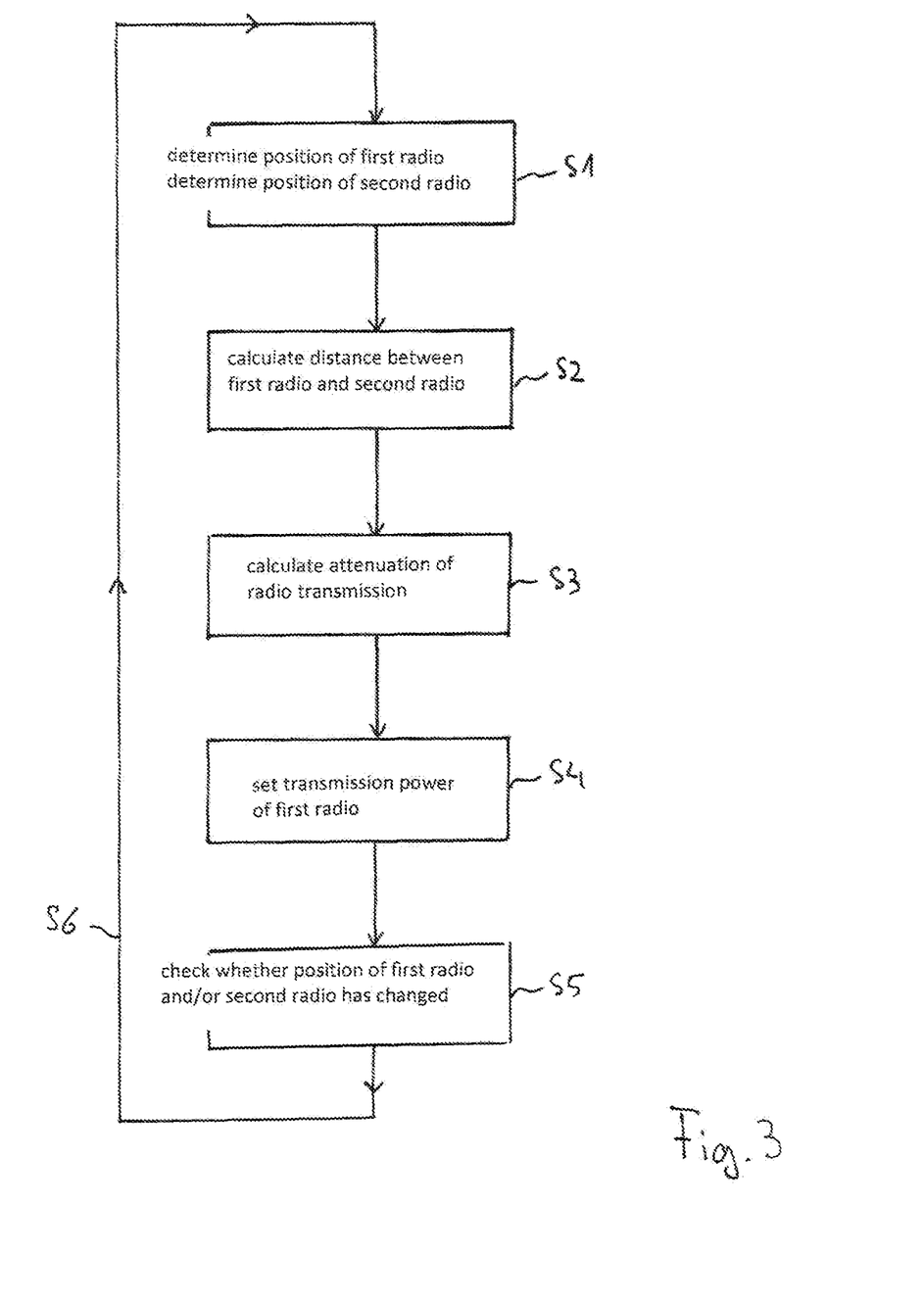
FIG. 3 shows a flow chart of a second embodiment of a method according to the invention.

FIG. 3 shows a flow chart of a second embodiment of the method according to the invention.

In addition to the steps S1-S4 illustrated in FIG. 2, the method shown in FIG. 3 comprises a dynamic adjustment of the transmission power. For this purpose, the method checks in step S5—constantly or regularly after predefined intervals—whether the position of the first radio 11 and/or the second radio 12 has changed. If a change of the position of the first radio 11 and/or the second radio 12 is detected, then in step S6 the method returns to the beginning of step S1 for an update setting of the transmission power.

Figure 4:
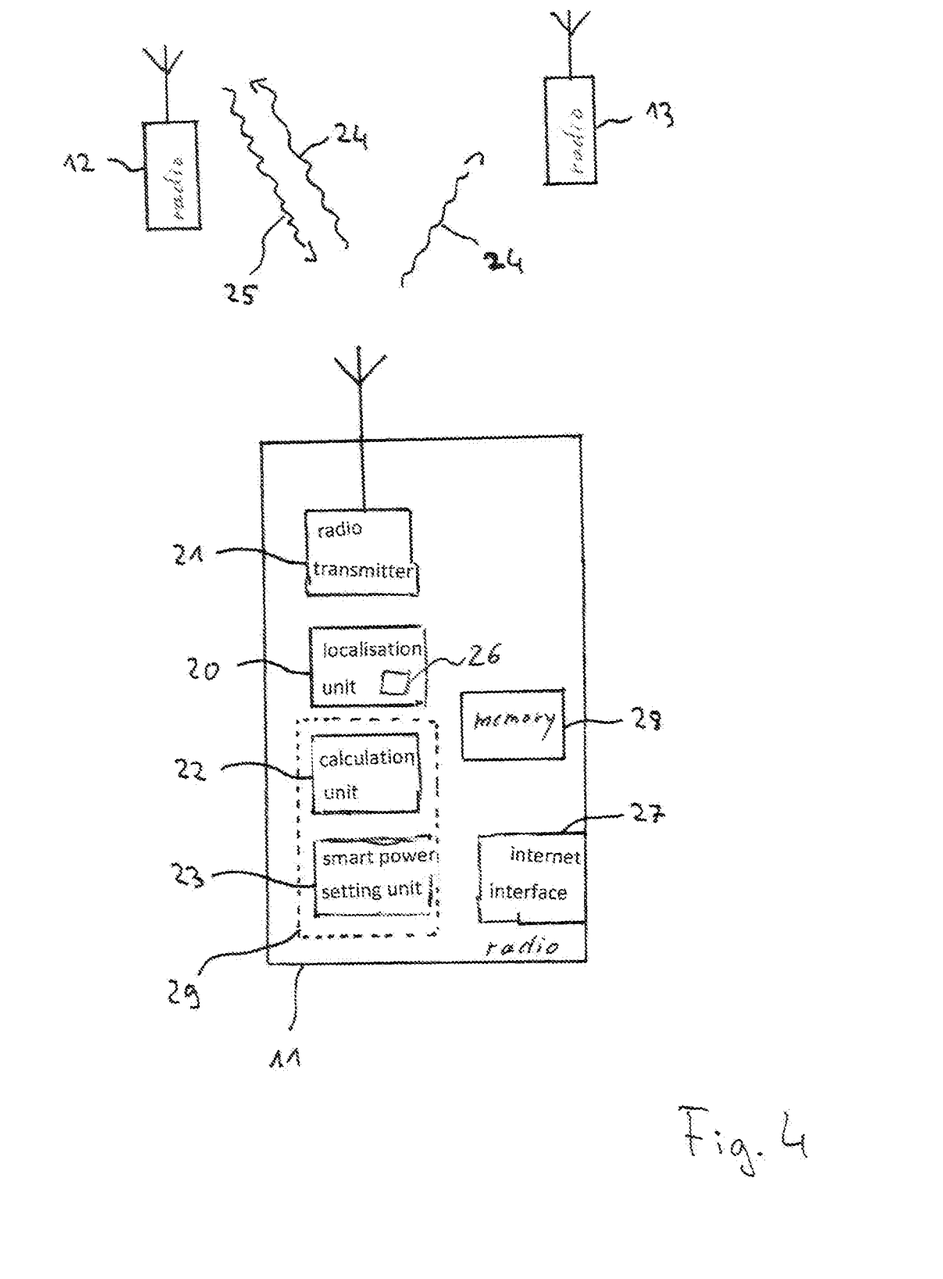
FIG. 4 shows a block diagram of an embodiment of a radio according to the invention.

FIG. 4 shows a block diagram of an embodiment of a radio according to the invention.

In FIG. 4, a transmitting radio 11 for transmitting radio signals is shown. The radio 11 comprises a localisation unit 20, a radio transmitter 21, a calculation unit 22 and a smart power setting unit 23.

The radio transmitter 21 is configured to transmit radio signal to other radios 12, 13 in the proximity of the transmitting radio 11. Typically, the radio transmitter 21 is part of a radio transceiver which is configured to transmit radio signals 24 and to receive radio signals 25 from other radios.

The localisation unit 20 is configured to determine the position of the radio 11. Further, the localisation unit 20 is adapted to receive position information of other radios 12, 13 in the proximity of the transmitting radio 11. According to the present invention, geo location information, such as data obtained from a GNSS system and/or SMRT data, are used for the determination of the positions. For this purpose, the localisation unit 20 comprises a GNSS unit 26 which is configured to provide the corresponding geo location information.

The calculation unit 22 is adapted to calculate the distances to the further radios 12, 13 based on the determined positions and to calculate the attenuation of a radio signal 24 which is to be transmitted from the radio transmitter 21 to the receiving radio 12, 13 based on the calculated distance and based on the necessary SNR.

The smart power setting unit 23 is configured to set the transmission power of the radio transmitter 21 based on the calculated attenuation of the radio transmission.

The calculation unit 22 and/or the smart power setting unit 23 may be part of a programmable unit 29 within the radio 11, such as a controller or a processor.

The transmitting radio 11 may comprise in a preferred embodiment an internet interface 27. This internet interface 27 allows the radio 11 accessing the internet in order to obtain necessary information, such as location information, position information and/or setting information from other sources or databases via the internet.

The transmitting radio 11 may comprise in a preferred embodiment a memory 28. The memory 28 may be used for storing geo location information, position information, SRTM data, setting, configuration data, etc.

Although the present invention has been described in the above by way of preferred embodiments, it is not limited thereto, but rather can be modified in a wide range of ways. In particular, the invention can be changed or modified in various ways without deviating from the core of the invention.

LIST OF USED REFERENCE SIGNS

10 radio system
11 (transmitting/first) radio
12 (receiving/second) radio
13 (receiving/third) radio
20 localisation unit
21 radio transmitter
22 calculation unit
23 smart power setting unit
24 radio signal
25 radio signal
26 GNSS unit
27 internet interface
28 memory
29 controller, processor
D1, D2 distances
S1-S6 method steps

What I claim is:

1. A method for setting the transmission power of a radio transmission of a transmitting radio, the method comprising:
    determining the position of a first radio and of a second radio, wherein for determining the position geo location information are used;
    calculating the distance between the first radio and the second radio based on the determined positions of the first and second radio;
    calculating an attenuation of a radio transmission from the transmitting first radio to the receiving second radio based on the calculated distance; and
    setting the transmission power of the transmitting first radio based on the calculated attenuation of the radio transmission, wherein setting the transmission power of the transmitting first includes calculating a transmission power value which is necessary for a predetermined necessary signal-to-noise-ration between the transmitting first radio and the receiving second radio.

2. The method of claim 1, wherein a Shuttle Radar Topography Mission (SRTM) dataset is employed for providing the geo location information, wherein the SRTM dataset comprises information of the elevation profile of the Earth's surface surrounding the first radio and second radio and preferably also the area between the first radio and second radio.

3. The method of claim 2, wherein the SRTM dataset is stored in a memory within the transmitting first radio.

4. The method of claim 1, wherein a Global Navigation Satellite System (GNSS) is employed for providing the geo location information.

5. The method of claim 1, wherein the step of calculating the attenuation is based on the Fresnel method.

6. The method of claim 1, wherein the step of calculating the attenuation is based on the ray tracing method.

7. The method of claim 1, wherein the step of setting the transmission power includes a dynamic adjustment of the transmission power.

8. The method of claim 1, wherein the step of setting the transmission power includes the calculation of a link budget between the transmitting first radio and receiving second radio.

9. The method of claim 1, wherein at least two receiving second radios are provided which are arranged in different distances to the transmitting first radio, wherein for the step of setting the transmission power of the first radio, in each case the receiving second radio which is furthest away from the first radio is used.

10. The method of claim 1, wherein at least two receiving second radios are provided which are arranged in different distances to the transmitting first radio, wherein for the step of setting the transmission power of the first radio, the transmitting powers necessary for each of the second radios are determined separately.

11. A radio for transmitting radio signals, the radio comprising:
    a localisation unit which is adapted to determine the position of the radio and which is further adapted to receive position information of a further radio, wherein geo location information are used for the determination of the positions of the radios;
    a radio transmitter which is configured to transmit a radio signal to the further radio;
    a calculation unit which is adapted to calculate the distance to the further radio based on the determined position and which is further adapted to calculate the attenuation of a radio signal which is transmitted from the radio transmitter to the receiving further radio based on the calculated distance; and
    a smart power setting unit which is configured to set the transmission power of the radio transmitter based on the calculated attenuation of the radio transmission, wherein the transmission power of the transmitting first is set by calculating a transmission power value which is necessary for a predetermined necessary signal-to-noise-ration between the transmitting first radio and the receiving second radio.

12. The radio of claim 11, wherein the localisation unit comprises a Global Navigation Satellite System (GNSS) unit for providing the geo location information.

13. The radio of claim 11, further comprising an internet interface which is configured to allow the radio to be connected to the Internet.

14. The radio according to claim 11, further comprising a memory for storing at least one of:
   geo location information;
   position information;
   Shuttle Radar Topography Mission (SRTM) data.

\* \* \* \* \*